(12) United States Patent
Tokunaga et al.

(10) Patent No.: US 7,201,220 B2
(45) Date of Patent: Apr. 10, 2007

(54) AIR-CONDITIONING UNIT WITHOUT AIR-MIX DOOR

(75) Inventors: Takahiro Tokunaga, Kosai (JP); Koji Ito, Nagoya (JP); Masakazu Nagaya, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/829,098

(22) Filed: Apr. 21, 2004

(65) Prior Publication Data

US 2004/0244962 A1 Dec. 9, 2004

(30) Foreign Application Priority Data

Apr. 25, 2003 (JP) ............... 2003-122282
Aug. 26, 2003 (JP) ............... 2003-301568

(51) Int. Cl.
  *B60H 1/00* (2006.01)
  *B60H 1/32* (2006.01)
  *F04D 29/42* (2006.01)
  *F04D 29/66* (2006.01)
  *F04D 27/00* (2006.01)

(52) U.S. Cl. ............... 165/202; 165/42; 165/43; 165/101; 165/244; 236/13; 454/156; 454/160; 454/161; 415/206; 415/127

(58) Field of Classification Search ............... 165/42, 165/43, 101, 244, 202; 236/13; 454/156, 454/160, 161; 415/206
See application file for complete search history.

(56) References Cited

U.S. PATENT DOCUMENTS 2,781,642 A * 2/1957 Jacobs ............... 62/157
2,804,756 A * 9/1957 Faulhaber et al. ............... 62/243
3,147,909 A * 9/1964 Novitsky ............... 415/127
6,093,096 A * 7/2000 Miyata et al. ............... 454/139

FOREIGN PATENT DOCUMENTS

| DE | 3229866 C | * 10/1986 |
| GB | 2121879 A | * 1/1984 |
| JP | 56-14896 | 2/1981 |
| JP | 59-77918 | 5/1984 |
| JP | 59195413 A | * 11/1984 |
| JP | 6-328927 | 11/1994 |
| JP | 2000-161298 | 6/2000 |
| JP | 2000309221 A | * 11/2000 |
| JP | 2001-315526 A | 11/2001 |
| WO | WO 98/12060 | * 3/1998 |

* cited by examiner

*Primary Examiner*—John K. Ford
(74) *Attorney, Agent, or Firm*—Harness, Dickey & Pierce, PLC

(57) ABSTRACT

An air conditioner for automotive vehicles is disclosed. The flow rates of air supplied to an evaporator (4) and a heater (5) are adjusted by rotationally displacing a scroll casing (2b) and thus changing an air flow from a blower (2) to a predetermined direction. The air-mix door can thus be eliminated to allow a smaller size of an air-conditioner casing (3) (air-conditioning unit (1)). Also, the ratio between cool air flow rate and hot air flow rate is adjusted by rotationally displacing the scroll casing (2b) with a spur gear (2c) and, therefore, the size and the production cost of the air conditioner can be reduced as compared with a conventional system in which an air-mix door is swung by a link mechanism.

10 Claims, 6 Drawing Sheets

Max Cool

Max Hot

AIR MIXED CONDITION

AIR-CONDITIONING UNIT WITHOUT AIR-MIX DOOR

BACKGROUND OF THE INVENTION

1. Field of the Invention

The present invention relates to an air-conditioning unit and is effectively applicable to an air conditioner for an automobile.

2. Description of the Related Art

In a conventional air conditioner for an automobile, an evaporator acting as a cooling unit is arranged in an air flow upstream of a heater acting as a heating unit, and the air flow-rate ratio between cool air cooled by the evaporator and bypassing the heater, and hot water heated by the heater is adjusted by an air-mix door, so that the cool air and the hot air are mixed thereby to regulate the temperature of the air discharged into a compartment (see Reference 1: Japanese Unexamined Patent Publication No. 6-328927, for example).

According to another prior art, a blower, for supplying fan-discharged air to a vehicle compartment through any one of a plurality of ducts, is used and a fan casing is rotated between a position for connecting a discharge port of the fan casing to an inlet of one duct and a position for connecting the discharge port of a casing to an inlet of another duct so that even in a case where air is discharged to a vehicle compartment through a duct, the air can flow smoothly from the fan to each duct (see Reference 2: Japanese Unexamined Patent Publication No. 56-14896, for example).

In still another prior art, the interior of an air-conditioner casing is separated into two stages, an upper and a lower, with an evaporator in the upper stage and a heater in the lower stage, respectively, and air from a blower is distributed to a heater-side path and an evaporator-side path by a temperature adjusting door (see Reference 3: Japanese Unexamined Patent Publication No. 59-77918, for example)

According to yet another prior art, a plurality of air supply boxes are arranged adjacent to each other along the axis of a centrifugal fan and are rotated independently of each other, thereby discharging air in an arbitrary direction from each of the air supply boxes (see Reference 3, for example)

In the invention of Reference 1, as the air flow-rate ratio between cool air and hot air is adjusted by the air-mix door, it is necessary to secure an operating space for rotating the air mix door in the air-conditioner casing (air-conditioning unit). This makes it difficult to reduce the size of the air-conditioner casing (air-conditioning unit).

Also, a link mechanism and an actuator are required to drive the air-mix door and, therefore, the size and production cost of the air-conditioner cannot easily be reduced.

In the invention described in Reference 2, on the other hand, the fan casing is switched between a position for connecting to a duct having no heater and a position for connecting to a duct having a heater. Therefore, the air-mix function for mixing the hot air and the cold air is not possible, thereby making it difficult to adjust the temperature of the air discharged into the compartment.

SUMMARY OF THE INVENTION

In view of the points described above, a first object of this invention is to provide a novel air-conditioner different from a conventional one.

A second object of this invention is to reduce the size of an air-conditioner casing (air-conditioning unit) by eliminating an air-mix door.

In order to achieve the objects described above, according to a first aspect of the present invention, an air-conditioner comprises:

a blower (2) including a fan (2a) and a casing (2b) for accommodating the fan (2a) to constitute an air path and to supply air to a compartment;

an air-conditioner casing (3) constituting a path for air supplied from the blower (2);

a cooling unit (4) arranged in the air-conditioner casing (3) for cooling the air supplied to the compartment;

a heating unit (5) arranged in the air-conditioner casing (3) for heating the air supplied to the compartment;

an air flow-rate adjusting means (2c) for adjusting flow rate of air supplied to the cooling unit (4) and flow rate of air supplied to the heating unit (5); and an air mixing chamber (3a) for mixing cool air cooled by the cooling unit (4) and hot air heated by the heating unit (5);

wherein the air flow-rate adjusting means (2c) adjusts the flow rate of air supplied to the cooling unit (4) and the flow rate of the air supplied to the heating unit (5), by changing a position of the casing (2b) and thereby changing a flow direction of air discharged from the blower (2) to a predetermined direction.

This configuration can eliminate air-mix doors and reduce the size of an air-conditioner casing (3), while, at the same time, facilitating the adjustment of the temperature of air supplied to a compartment by mixing hot air and cool air.

According to a second aspect of the invention, an air-conditioner comprises:

a blower (2) including a fan (2a) and a casing (2b) for accommodating the fan (2a) to constitute an air path and to supply air to a compartment;

an air-conditioner casing (3) constituting a path of air supplied from the blower (2);

a cooling unit (4) arranged in the air-conditioner casing (3) for cooling the air supplied into the compartment;

a bypass (5a) for supplying air to the compartment after the air bypasses the cooling unit (4);

an air flow-rate adjusting means (2c) for adjusting flow rate of air supplied to the cooling unit (4) and flow rate of air flowing through the bypass (5a); and an air mixing chamber (3a) for mixing cool air cooled by the cooling unit (4) and air flowing through the bypass (5a);

wherein the air flow-rate adjusting means (2c) adjusts the flow rate of the air supplied to the cooling unit (4) and the flow rate of the air flowing through the bypass (5a), by changing a position of the casing (2b) and, thereby, changing a flow direction of air discharged from the blower (2) to a predetermined direction.

According to a third aspect of the invention, an air-conditioner unit comprises:

a blower (2) including a fan (2a) and a casing (2b) for accommodating the fan (2a) to constitute an air path and to supply air to a compartment;

an air-conditioner casing (3) constituting a path of air supplied from the blower (2);

a heating unit (5) arranged in the air-conditioner casing (3) for heating the air supplied to the compartment;

a bypass (4a) for supplying air to the compartment after the air bypasses the heating unit (5);

an air flow-rate adjusting means (2c) for adjusting flow-rate of air supplied to the heating unit (5) and flow-rate of air flowing through the bypass (4a); and an air mixing chamber (3a) for mixing hot air heated by the heating unit (5) and air flowing through the bypass (4a);

wherein the air flow-rate adjusting means (2c) adjusts the flow rate of the air supplied to the heating unit (5) and the flow rate of the air flowing through the bypass (4a) by changing a position of the casing (2b) and, thereby, changing a flow direction of air discharged from the blower (2) to a predetermined direction.

According to a fourth aspect of the invention, an air-conditioner comprises:

a blower (2) for supplying air to a compartment;

an air-conditioner casing (3) constituting a path of air supplied from the blower (2);

a cooling unit (4) arranged in the air-conditioner casing (3) for cooling air supplied to the compartment;

a heating unit (5) arranged in the air-conditioner casing (3) for heating air supplied to the compartment;

an air flow-rate adjusting means (9a, 9b) for adjusting flow rate of air supplied to the cooling unit (4) and flow rate of air supplied to the heating unit (5); and an air mixing chamber (3a) for mixing cool air cooled by the cooling unit (4) and hot air heated by the heating unit (5);

wherein the air flow-rate adjusting means adjusts the flow rate of the air supplied to the cooling unit (4) and the flow rate of the air supplied to the heating unit (5), by changing a flow direction of air discharged from the blower (2) with plate-door-like guides (9a, 9b).

According to a fifth aspect of the invention, an air-conditioner comprises:

a blower (2) for supplying air to a compartment;

an air-conditioner casing (3) constituting a path of air supplied from the blower (2);

heat exchangers (4, 5) arranged in the air-conditioner casing (3) for heating or cooling the air supplied to the compartment;

a bypass (4a, 5a) for supplying air to the compartment after the air bypasses the heat exchangers (4, 5);

an air flow-rate adjusting means (9a, 9b) for adjusting flow rate of air supplied to the heat exchangers (4, 5) and flow rate of air flowing through the bypass (4a, 5a); and an air mixing chamber (3a) for mixing air flowing through the heat exchangers (4, 5) and air flowing through the bypass;

wherein the air flow-rate adjusting means adjusts the flow rate of the air supplied to the heat exchangers (4, 5) and the flow rate of the air flowing through the bypass by changing a flow direction of air discharged from the blower (2) to a predetermined direction with plate-door-like guides (9a, 9b).

According to a sixth aspect of the invention, there is provided an air-conditioner, wherein the cooling unit (4) and the heating unit (5) are arranged in parallel with each other with respect to a flow of supplied air.

According to a seventh aspect of the invention, there is provided an air-conditioner, wherein the air flow-rate adjusting means (2c) rotates the casing (2b) about a rotational axis of the fan (2a).

According to an eighth aspect of the invention, there is provided an air-conditioner, wherein the air flow-rate adjusting means (2c) rotates the casing (2b) and a motor for rotating the fan (2a), about a rotational axis of the fan (2a).

According to a ninth aspect of the invention, there is provided an air-conditioner, wherein the air flow-rate adjusting means (2c, 9a, 9b) controls the whole flow rate of the air discharged from the blower (2) to the cooling unit (4) in a maximum cooling mode.

According to a tenth aspect of the invention, there is provided an air-conditioner, wherein the air flow-rate adjusting means (2c, 9a, 9b) controls the whole flow rate of air discharged from the blower (2) to the heating unit (5) in a maximum heating mode.

The present invention may be more fully understood from the description of the preferred embodiments of the invention set forth below, together with the accompanying drawings.

DESCRIPTION OF THE PREFERRED EMBODIMENTS

First Embodiment

Figure 1:
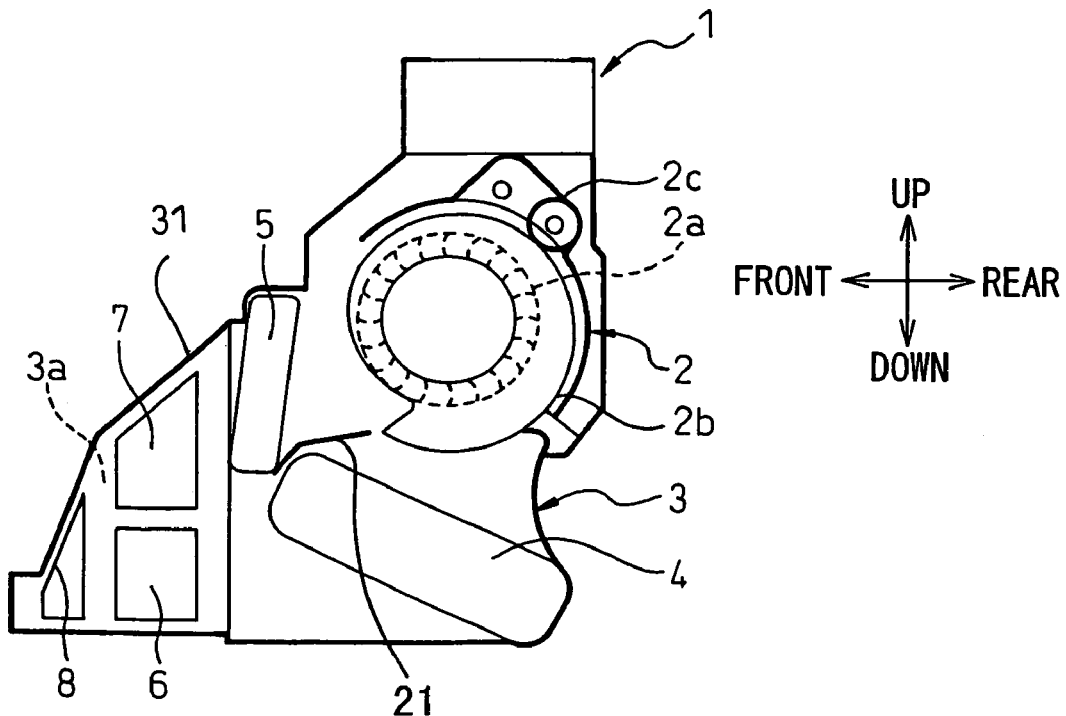
FIG. 1 is a schematic diagram showing an air-conditioning unit according to a first embodiment of the invention.

This embodiment represents an application of the air-conditioner according to the present invention used for air-conditioning a rear seat of an automobile. FIG. 1 is a sectional view schematically showing an air-conditioning unit 1 for an automotive air conditioner according to this embodiment.

The air-conditioning unit 1 according to this embodiment is installed on the front side in a trunk behind the rear seat in such a manner that an inclined portion of the air-conditioning unit 31 shown on the left side of FIG. 1 is arranged substantially along a back of the rear seat.

A blower 2 which is a means to supply air to a automobile compartment, sucks internal air from a rear tray arranged in the neighborhood of a rear window glass, and supplies the air to an evaporator 4 and a heater 5 described later.

The blower 2 comprises a centrifugal fan 2a (Japanese Industrial Standard (JIS) B 0132, No. 1004, etc.), in which air is discharged in the radial direction thereof, an electric motor (not shown) for rotating the centrifugal fan 2a, and a scroll casing 2b for accommodating the centrifugal fan 2a to make up a vortex air-path for gathering the air discharged from the centrifugal fan 2a. According to this embodiment, the blower 2 is arranged in such a manner that a rotating shaft of the centrifugal fan 2a is arranged horizontally and coincides with the transverse direction of the vehicle.

The air-conditioner casing 3 makes up a path of air discharged from the blower 2, and in this embodiment, is formed of resin such as polypropylene.

An evaporator 4 acting as a cooling unit for cooling air supplied to the compartment and a heater 5 acting as a heating unit for heating air supplied to the compartment are accommodated, on the air discharging side of the blower 2, in the air-conditioner casing 3. The evaporator 4 and the heater 5 are arranged in parallel with each other with respect to a flow of air discharged from the blower 2.

The evaporator 4 is a low-pressure side heat exchanger of a vapor compression refrigerator for absorbing heat from a low-temperature side and radiating the heat to a high-temperature side by evaporating a low-pressure refrigerant the pressure of which is reduced. The heater 5 is a heating means deriving heat from the waste heat generated in a vehicle engine or the like, and in this embodiment, uses an engine cooling water as a heat source.

According to this embodiment, the evaporator 4 is arranged downstream of the heater 5, and substantially horizontally, so that air supplied to the evaporator 4 passes through the evaporator 4 from an upper side of the air conditioning unit to a lower side thereof. In this arrangement, the evaporator 4 and the heater 5 are arranged in a shape of a V protruded toward the vehicle front in such a manner as to surround or encircle the blower 2. A partition plate 21 separates the heater 5 from the evaporator 4.

Openings including a face-side opening 6, a foot-side opening 7 and a seat air-conditioning opening 8 are formed in the air flow downstream of the evaporator 4 and the heater 5.

The face-side opening 6 is connected through a duct to a face-side air outlet (not shown) for discharging air-conditioned air from the air-conditioner casing 3 into the compartment from above the rear seat. The foot-side opening 7, on the other hand, is connected through a duct to a foot-side air outlet (not shown) for discharging the air-conditioned air into the compartment from under the rear seat. Also, the seat air-conditioner opening 8 is connected through a duct to a seat air-conditioning air outlet (not shown) for discharging the air-conditioned air into the compartment from the seat back.

The face-side air outlet is arranged on the vehicle ceiling above the rear seat. The duct connecting the face-side air outlet and the face-side opening 6 is embedded in a C pillar acting as a support at a rear window side.

The internal part of the air-conditioner casing 3, in which the face-side air opening 6, the foot-side air opening 7, the seat air-conditioning opening 8, etc. are arranged, constitutes an air mixing chamber 3a for mixing cool air cooled by the evaporator 4 and hot air heated by the heater 5.

Air passing through the heater 5, when viewed from the evaporator 4 side, is supplied to the compartment while bypassing the evaporator 4. An air path having the heater 5 thus constitutes, when viewed from the evaporator 4, a bypass of the air flowing into the compartment bypassing the evaporator 4.

In similar fashion, air passing through the evaporator 4, when viewed from the heater 5 side, is supplied to the compartment while bypassing the heater 5. An air path having the evaporator 4, therefore, when viewed from the heater 5, constitutes a bypass of the air flowing into the compartment bypassing the heater 5.

According to this embodiment, the scroll casing 2b is configured to be rotationally displaced about the rotational center of the centrifugal fan 2a by a spur gear 2c rotationally driven by an electric actuator (not shown) such as a servo motor. In this embodiment, the amount of rotational displacement of the scroll casing 2b is controlled according to the target blowout air temperature TAO.

Figure 2:
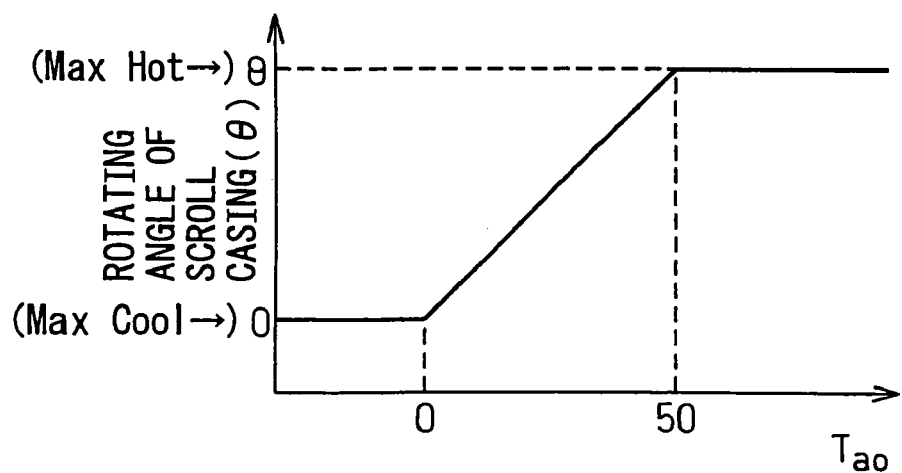
FIG. 2 is a graph showing the relation between the rotational angle of a scroll casing and a target blowout air temperature TAO according to the invention.

Specifically, as shown in FIG. 2, if the scroll casing 2b is at position 0° in maximum cooling (MAXCOOL) mode and is at position θ20 in maximum heating (MAXHOT) mode the rotating angle of the scroll casing 2b is increased in proportion to the increase in the target blowout air temperature TAO.

The position of the air outlet of the scroll casing 2b is changed by rotating the scroll casing 2b to, thereby, adjust the flow rates of air discharged from the blower 2 to the evaporator 4 and the heater 5.

Specifically, the air outlet of the scroll casing 2b is directed toward the evaporator 4, so that flow rate of air supplied to the evaporator 4, i.e. a flow rate of cool air, is increased while, at the same time, reducing a flow rate of air supplied to the heater 5, i.e. a flow rate of hot air.

By directing the air outlet of the scroll casing 2b toward the heater 5, in contrast, the flow rate of the hot air is increased, while the flow rate of the cool air is decreased. In this way, the ratio between the cool air flow rate and the hot air flow rate can be adjusted by rotating the scroll casing 2b.

The actuator for rotationally displacing the scroll casing 2b is controlled by an electronic control unit (ECU). The ECU is supplied with the temperature signals from an internal air temperature sensor for detecting the compartment air temperature, a sunlight sensor for detecting the sunlight amount radiated on the rear seat and the desired compartment temperature set by an occupant.

Based on these input values, the ECU calculates the target temperature of the air discharged into the compartment, i.e. the target blowout air temperature TAO, in accordance with the program stored, in advance, in a ROM (read-only memory), or the like, and also calculates the ratio between the cool air flow rate and the hot air flow rate, on which the target blowout air temperature TAO is based, to thereby rotate the scroll casing 2b.

Next, the operation constituting the features of this embodiment is explained.

Figure 3:
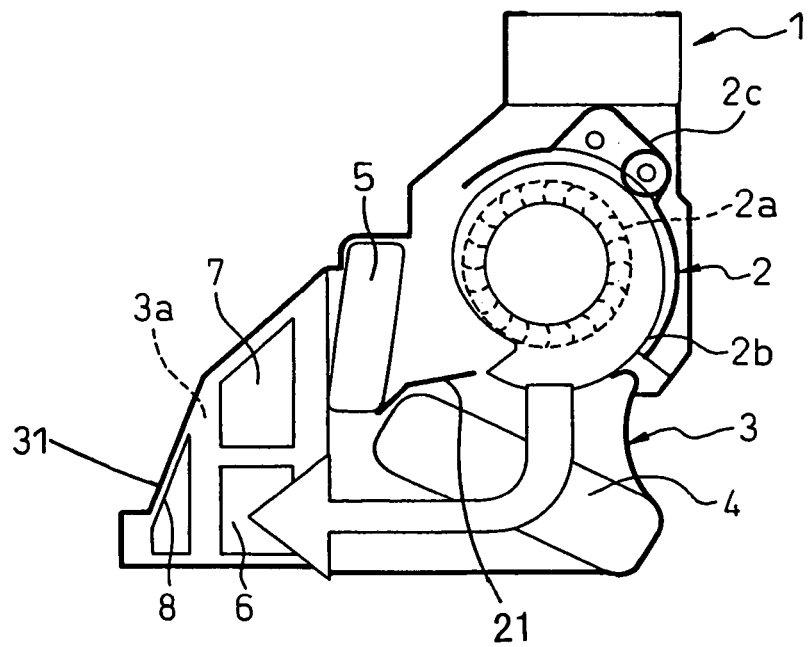
FIG. 3 is a schematic diagram showing the operation of the air-conditioning unit according to the first embodiment of the invention.

FIG. 3 shows an operating state in the maximum cooling (MAXCOOL) mode. In MAXCOOL mode, the whole flow rate of the air from the blower 2 is supplied to the evaporator 4 thereby to set the cool air ratio to 100%.

Figure 4:
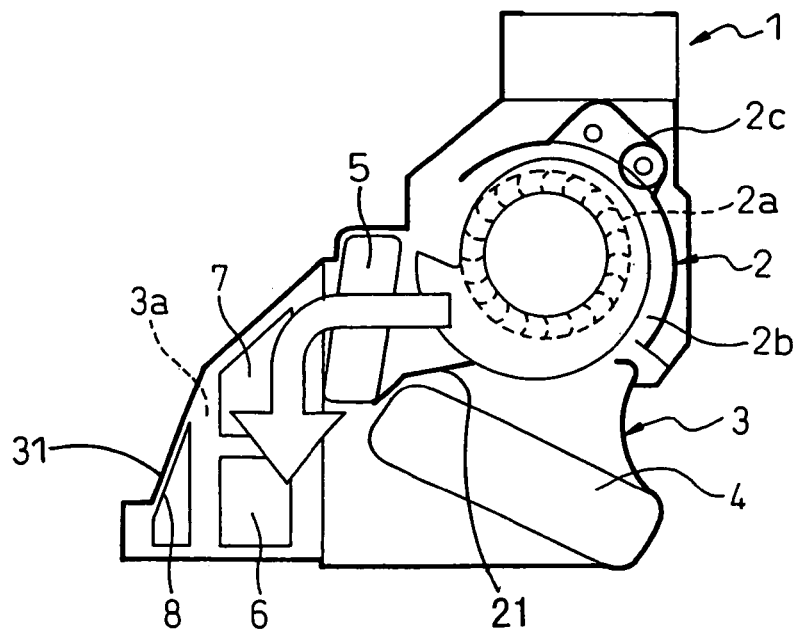
FIG. 4 is a schematic diagram showing the operation of the air-conditioning unit according to the first embodiment of the invention.

FIG. 4 shows an operating state in the maximum heating (MAXHOT) mode. In MAXHOT mode, the whole flow rate of the air from the blower 2 is supplied to the heater 5 thereby to set the hot air ratio to 100%.

Figure 5:
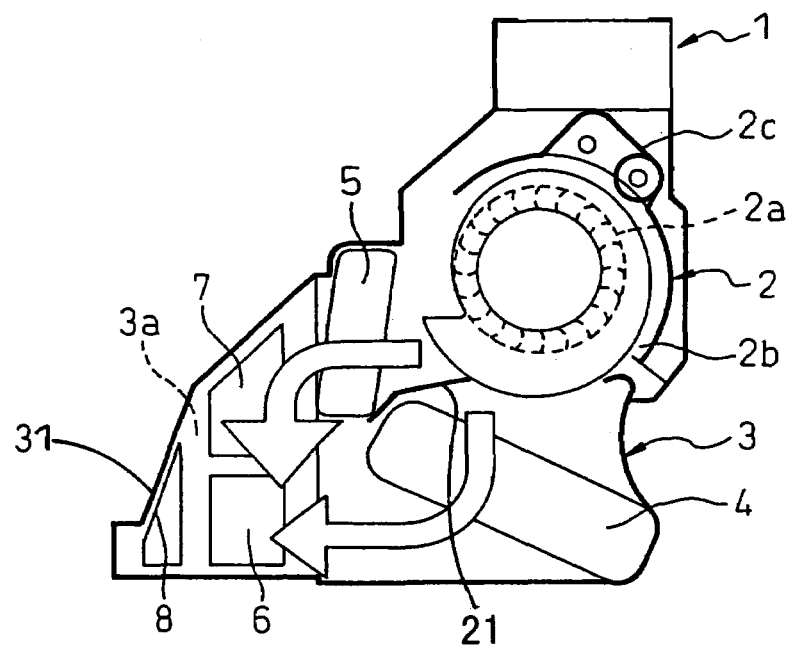
FIG. 5 is a schematic diagram showing the operation of the air-conditioning unit according to the first embodiment of the invention.

FIG. 5 shows the state in which the cool air and the hot air are mixed with each other (air mix mode). As described above, the temperature of the air discharged into the compartment is regulated by adjusting the ratio between the cool air flow rate and the hot air flow rate based on the target blowout air temperature TAO.

Next, the functions and effects of this embodiment are explained.

According to this embodiment, the flow rate of the air supplied to the evaporator 4 and the heater 5 is adjusted by rotationally displacing the scroll casing 2b and thus changing the flow of the air from the blower 2 to a predetermined direction. Therefore, the air-mix door can be eliminated and the air-conditioner casing 3 (air-conditioning unit 1) can be reduced in size.

According to this embodiment, the ratio between the cool air flow rate and the hot air flow rate is adjusted by rotationally displacing the scroll casing 2b through the spur gear 2c. As compared with the prior art in which an air-mix door is swung by a link mechanism and, therefore, both the size and the production cost of the air conditioner can be reduced.

Also, as the evaporator 4 is arranged downstream of the air-conditioner casing 3, condensed water generated in the evaporator 4 can be discharged easily out of the air-conditioner casing 3.

As the evaporator 4 and the heater 5 are arranged in a shape of V in such a manner as to surround the blower 2, the size of the air-conditioner can be reduced as compared with the parallel arrangement of the evaporator 4 and the heater 5.

Further, as the air-conditioned air is supplied to the compartment after the hot air heated by the heater 5 and the cool air cooled by the evaporator 4 are mixed with each other, the temperature of the air supplied to the compartment can be easily adjusted.

Second Embodiment

Figure 6:
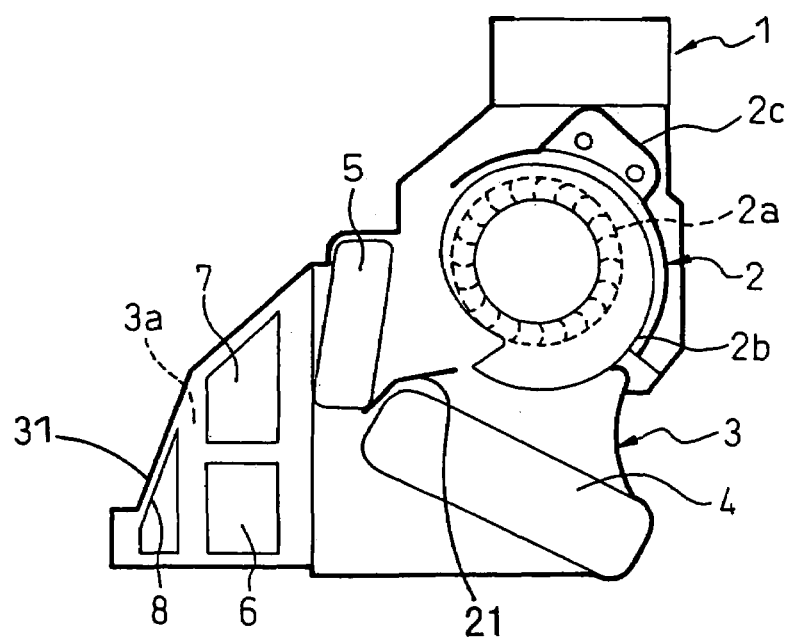
FIG. 6 is a schematic diagram showing an air-conditioning unit according to a second embodiment of the invention.

According to the first embodiment, only the scroll casing 2b is rotationally displaced. According to a second embodiment, on the other hand, as shown in FIG. 6, the electric motor as well as the scroll casing 2b is rotationally displaced about the rotational center of the centrifugal fan 2a.

Third Embodiment

Figure 7:
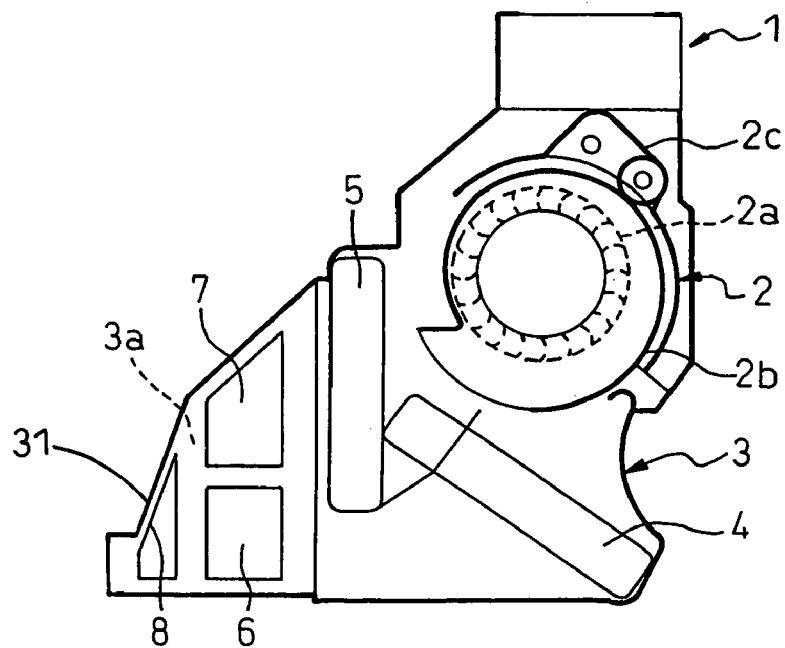
FIG. 7 is a schematic diagram showing an air-conditioning unit according to a third embodiment of the invention.

Unlike the first and second embodiments in which the evaporator 4 and the heater 5 not superposed one on the other are arranged substantially in a shape of V in such a manner as to surround the blower 2, a third embodiment is such that, as shown in FIG. 7, the evaporator 4 and the heater 5 are arranged substantially in a shape of V with a part of the evaporator 4 superposed on the heater 5.

Fourth Embodiment

Figure 8:
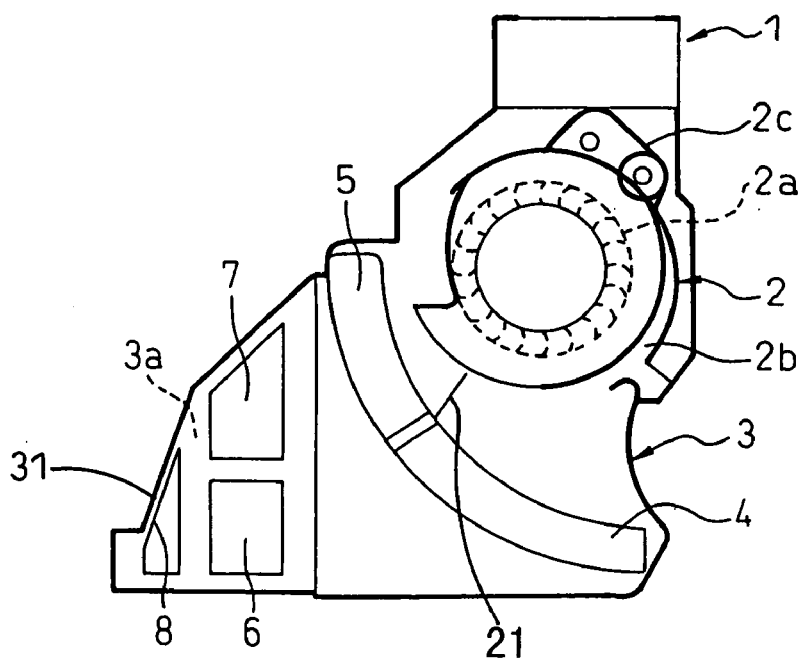
FIG. 8 is a schematic diagram showing an air-conditioning unit according to a fourth embodiment of the invention.

Unlike the first to third embodiments in which the evaporator 4 and the heater 5 are formed as parts independent of each other, a fourth embodiment is such that, as shown in FIG. 8, the evaporator 4 and the heater 5 are integrated with each other and curved in a substantially arcuate form.

Fifth Embodiment

Figure 9:
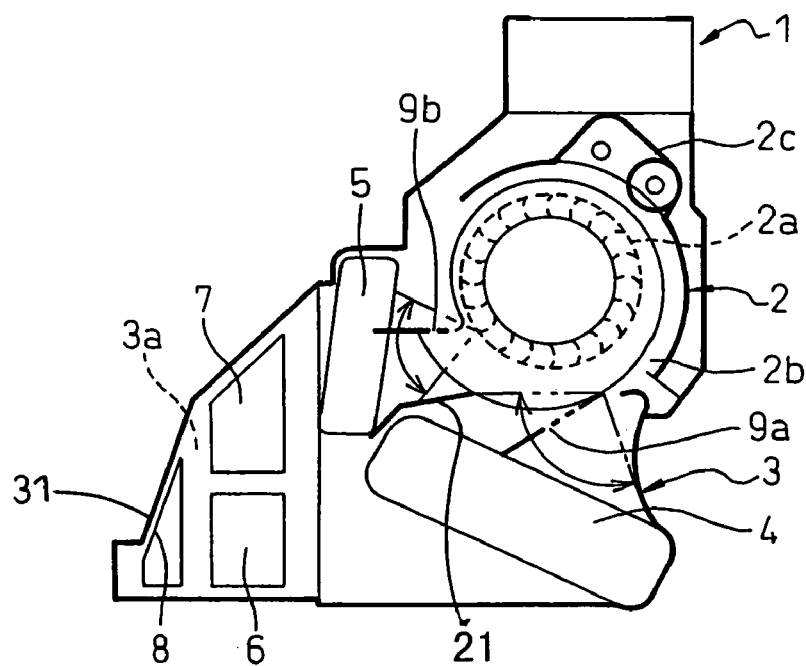
FIG. 9 is a schematic diagram showing an air-conditioning unit according to a fifth embodiment of the invention.

According to the first to fourth embodiments, the flow rate of the air supplied to the evaporator 4 and the flow rate of the air supplied to the heater 5 are adjusted by rotationally displacing the scroll casing 2b and thus changing the flow of the air from the blower 2 to a predetermined direction. In a fifth embodiment, on the other hand, as shown in FIG. 9, the flow rate of the air supplied to the evaporator 4 and the flow rate of the air supplied to the heater 5 are adjusted by swinging two plate-door-like guides 9a, 9b and thus changing the flow of the air from the blower 2 to a predetermined direction with the scroll casing 2b being fixed.

The guide 9a is for adjusting the flow rate of air supplied to the evaporator 4, while the guide 9b is for adjusting the flow rate of air supplied to the heater 5. The operation of the guides 9a, 9b is controlled by the ECU based on the target blowout air temperature TAO. The guides 9a, 9b are operatively interlocked with each other either electrically or mechanically.

Sixth Embodiment

The first to fifth embodiments represent an air conditioner comprising the evaporator 4 and the heater 5. According to a sixth embodiment, on the other hand, as shown in FIG. 10, the heater 5 is eliminated and is replaced by a bypass 5a for supplying air bypassing the evaporator 4.

As a result, like in the first to fifth embodiments, the air-mix door can be eliminated and, therefore, the air-conditioner casing 3 can be reduced in size.

In the air mixing chamber 3a, the temperature of the air supplied to the compartment can be easily adjusted by mixing the cool air cooled by the evaporator 4 and the air not cooled by the evaporator 4, i.e. the air flowing through the bypass 5a.

Figure 10:
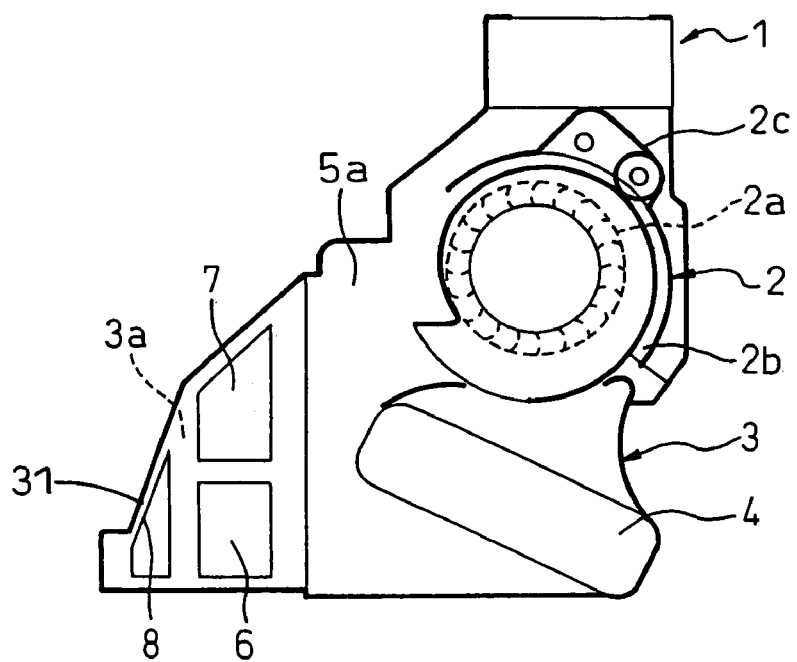
FIG. 10 is a schematic diagram showing an air-conditioning unit according to a sixth embodiment of the invention.

Incidentally, FIG. 10 shows a case in which, as in the first to fourth embodiments, the flow rate of the cool air cooled by the evaporator 4 and the flow rate of the air not cooled by the evaporator 4 are adjusted by rotating the scroll casing 2b. As in the fifth embodiment, however, the flow rate of the cool air cooled by the evaporator 4 and the flow rate of the air not cooled by the evaporator 4 may be adjusted by swinging the two plate-door-like guides 9a, 9b, in FIG. 10.

Seventh Embodiment

Figure 11:
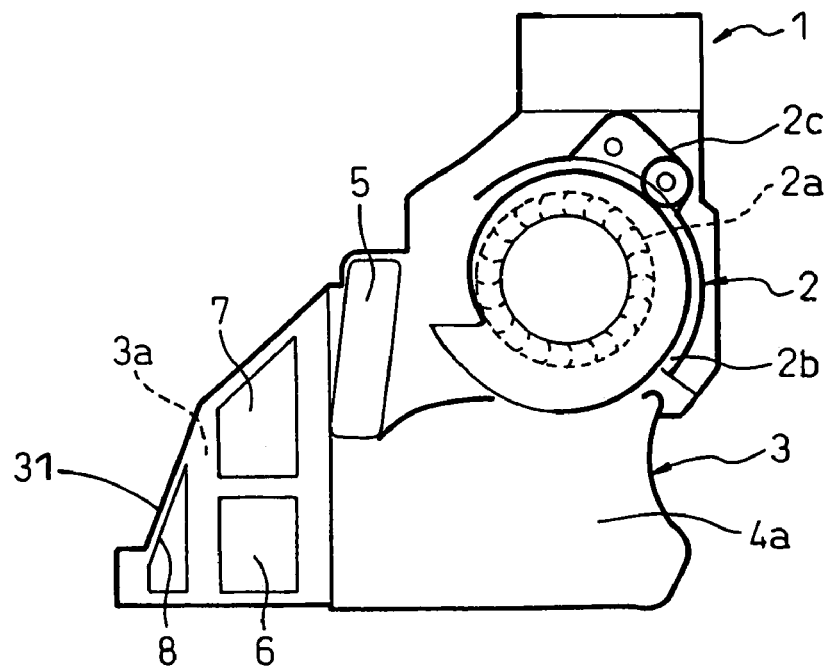
FIG. 11 is a schematic diagram showing an air-conditioning unit according to a seventh embodiment of the invention.

Unlike in the first to fifth embodiments referring to an air conditioner comprising the evaporator 4 and the heater 5, a seventh embodiment, as shown in FIG. 11, the evaporator 4 is eliminated and is replaced with a bypass 4a for supplying the air bypassing the heater 5.

As a result, as in the first to fifth embodiments, the air-mix door can be eliminated and, therefore, the air-conditioner casing 3 can be reduced in size.

The hot air heated by the heater 5 and the air not heated by the heater 5, i.e. the air flowing through the bypass 4a are mixed with each other in the air mixing chamber 3a and, thereby, it is possible to easily adjust the temperature of the air discharged into the compartment.

Incidentally, FIG. 11 shows a case in which, as in the first to fourth embodiments, the flow rate of the hot air heated by the heater 5 and the flow rate of the air not heated by the heater 5 are adjusted by rotating the scroll casing 2b. As in the fifth embodiment, however, the flow rate of the hot air heated by the heater 5 and the flow rate of the air not heated by the heater 5 may be adjusted by swinging the two plate-door-like guides 9a, 9b.

Eighth Embodiment

Figure 12:
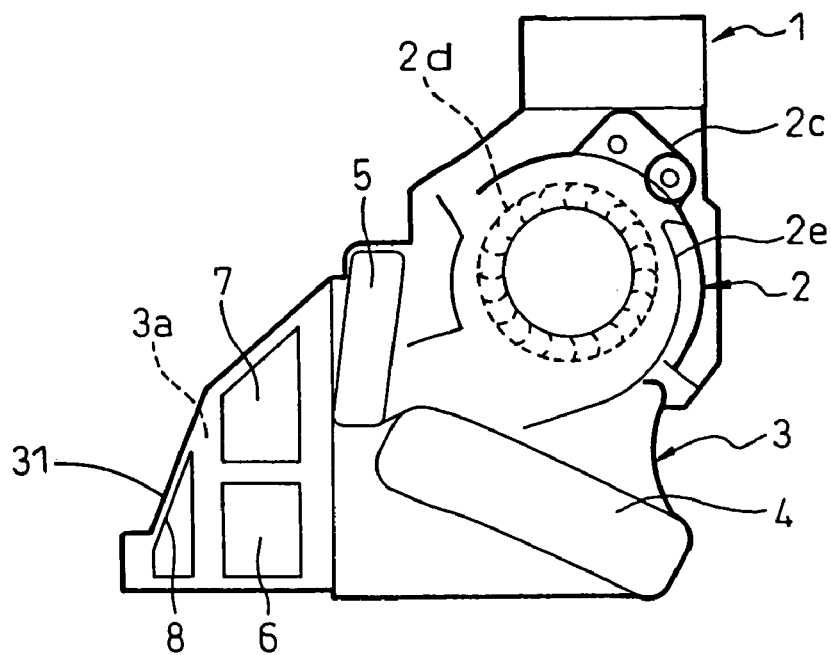
FIG. 12 is a schematic diagram showing an air-conditioning unit according to an eighth embodiment of the invention.

In the first to seventh embodiments, the blower 2a includes a centrifugal fan 2a for sucking air from the axial direction of the rotating shaft and discharging the air toward the circumferential direction thereof. According to an eighth embodiment, on the other hand, as shown in FIG. 12, the blower 2 comprises an axial-flow fan (JIS B 0132, No. 1017) 2d for allowing the air to pass through the cross section orthogonal to the rotating shaft, a casing 2e for accommodating the axial-flow fan 2d to form an air path, etc. Also, as in the first to fourth embodiments, the casing 2e is rotated based on the target blowout air temperature TAO thereby to adjust the flow rate of the cool air and the hot air.

FIG. 12 shows an application of an eighth embodiment to the first embodiment. Nevertheless, the eighth embodiment is not limited to such an application and, of course, is applicable also to any of the second to sixth embodiments.

Other Embodiments

Unlike in the aforementioned embodiments with the evaporator 4 arranged on a lower side of the air-conditioner casing 3, the invention is not limited to such a case. As an alternative, the heater 5 may be arranged, for example, on the lower side of the air-conditioner casing 3.

Also, according to the embodiments described above, the evaporator 4 and the heater 5 are arranged in the form of V in such a manner as to surround the blower 2. The present invention is not limited to this configuration, but the evaporator 4 and the heater 5 may be arranged, for example, in parallel with each other.

In the embodiments described above the air conditioner according to the present invention is used for air-conditioning the rear seat in the automobile. Nevertheless, the invention is not limited to this configuration but may be used also for the air-conditioner, such as for a front seat or for a stationary type used in a building.

Although the scroll casing 2b is rotated by the spur gear 2c in the embodiments described above, this invention is not limited to this configuration.

Instead of the centrifugal fan 2a employed in the aforementioned embodiments, the invention is not limited to this configuration and may alternatively use, for example, an axial-flow fan (JIS B 0132, No. 1017) in which air passes through the cross section orthogonal to the axis of the rotating shaft in an impeller.

Also, this invention is not limited to the aforementioned embodiments in which the evaporator 4 and the heater 5 are arranged exactly in parallel to the air flow. As an alternative, for example, a part of the heater 5 may be located in the air flow downstream of the evaporator 4.

While the invention has been described by reference to specific embodiments chosen for the purposes of illustration, it should be apparent that numerous modifications could be made thereto by those skilled in the art without departing from the basic concept and scope of the invention.

The invention claimed is:

1. An air-conditioner in combination with a vehicle comprising:
    a blower including a fan and a fan casing for accommodating the fan to constitute an air path, and supplying air to a compartment;
    an air-conditioner casing constituting a path for air supplied from the blower;
    a cooling unit arranged in the air-conditioner casing for cooling the air supplied into the compartment;
    a heating unit arranged in the air-conditioner casing for heating the air supplied into the compartment;
    air flow-rate adjusting means for adjusting a flow rate of air supplied to the cooling unit and a flow rate of air supplied to the heating unit; and
    an air mixing chamber for mixing cool air cooled by the cooling unit and hot air heated by the heating unit; wherein
    the air flow-rate adjusting means adjusts the flow rate of the air supplied to the cooling unit and the flow rate of the air supplied to the heating unit, by changing a position of the fan casing and thereby changing a flow direction of air discharged from the blower to a predetermined direction;
    the cooling inlet of the cooling unit and a heating inlet of the heating unit are arranged in parallel with each other in such a manner as to partially encircle the blower;
    the air-conditioner casing is installed on a front side in a trunk compartment behind a rear seat of the vehicle in such a manner that an inclined portion of the air-conditioner casing is arranged on a front side of the air-conditioner casing in a vehicle longitudinal direction and extends along a backrest of the rear seat;
    the blower is arranged at a rear upper side of the vehicle in the air-conditioner casing;
    the blower is arranged in such a manner that an axial direction of a rotating shaft of the fan extends in a transverse direction of the vehicle;
    the cooling unit is arranged substantially horizontally and directly below the rotating shaft of the fan;
    the heating unit is arranged substantially vertically at a front side of the vehicle with respect to the blower so as to be located close to an end of the cooling unit; and
    the air mixing chamber is arranged at a front lower side of the vehicle in the air-conditioner casing.

2. The combination according to claim 1, wherein the cooling inlet of the cooling unit and the heating inlet of the heating unit are arranged in fluidic parallel with each other with respect to an axis of rotation of the fan.

3. The combination according to claim 1, wherein the air flow-rate adjusting means rotates the fan casing about a rotational axis of the fan.

4. The combination according to claim 1, wherein the air flow-rate adjusting means directs the whole flow rate of air discharged from the blower to the cooling unit in a maximum cooling mode.

5. The combination according to claim 1, wherein the air flow-rate adjusting means directs the whole flow rate of air discharged from the blower to the heating unit in a maximum heating mode.

6. The combination according to claim 1, wherein a partition plate is provided and extends from an outlet area of the air-conditioner casing to a space between the cooling unit and the heating unit.

7. The combination according to claim 1, wherein the cooling unit and the heating unit are arranged in a V shape to partially encircle the blower.

8. The combination according to claim 1, wherein air flowing through the heating unit and air flowing through the cooling unit are always directed into the air mixing chamber.

9. The combination according to claim 1, wherein air discharge openings for discharging air-conditioned air are provided in a front side of the cooling unit and the heating unit in the vehicle longitudinal direction and are arranged along the inclined portion of the air-conditioner casing, and an upper end of the air discharge openings is located below an upper end of the heating unit.

10. The combination according to claim 1, wherein the air conditioner further comprises:
    an electronic control unit for calculating a target blowout air temperature of air-conditioned air and for calculating a specific ratio between a cool air flow and a hot air flow on which the target blowout air temperature of the air-conditioned air is based, the electronic control unit controlling the position of the fan casing so as to set an air-flow ratio between air discharged from the blower to the cooling unit and air discharged from the blower to the heating unit equal to the specific ratio.

* * * * *